US009074622B2

(12) United States Patent
Morgan et al.

(10) Patent No.: US 9,074,622 B2
(45) Date of Patent: Jul. 7, 2015

(54) DISPOSABLE BAG AND A DISPOSABLE BAG MOUNT BRACKET FOR AN UPRIGHT VACUUM CLEANER

(75) Inventors: Charles Jeff Morgan, Sparta, TN (US); Victor Brent McClearen, Cookeville, TN (US); Ernest Matthew Chavana, Jr., Cookeville, TN (US); Bruce M. Kiern, Cookeville, TN (US); Charles Andrew Liter, Cookeville, TN (US); George Virgle Hibbs, Cookeville, TN (US); Dennis Thomas Lamb, Pass Christian, MS (US); Timothy Kolody, Powell, TN (US); Christopher M. Paterson, Franklin, TN (US)

(73) Assignee: Techtronic Floor Care Technology Limited, Tortola (VG)

( * ) Notice: Subject to any disclaimer, the term of this patent is extended or adjusted under 35 U.S.C. 154(b) by 533 days.

(21) Appl. No.: 13/288,798

(22) Filed: Nov. 3, 2011

(65) Prior Publication Data

US 2013/0111696 A1 May 9, 2013

(51) Int. Cl.
B01D 46/02 (2006.01)
A47L 9/14 (2006.01)
F16C 19/26 (2006.01)
(Continued)

(52) U.S. Cl.
CPC ............ *F16C 19/26* (2013.01); *Y10T 29/49895* (2015.01); *A47L 5/30* (2013.01); *A47L 9/0018* (2013.01); *A47L 9/009* (2013.01); *A47L 9/0444* (2013.01); *A47L 9/122* (2013.01);
(Continued)

(58) Field of Classification Search
USPC ......... 55/374, 376, 377, 378, DIG. 2; 15/350, 15/351, 347, DIG. 8
See application file for complete search history.

(56) References Cited

U.S. PATENT DOCUMENTS 1,104,612 A 7/1914 Bodey
1,108,248 A 8/1914 Schmitz
(Continued)

FOREIGN PATENT DOCUMENTS

CN 203314892 12/2013
EP 0532057 3/1993
JP 2008168021 7/2008

OTHER PUBLICATIONS http://meridian-mag.com/magnesium/datasheet.pdf, Magnesium Material Properties printed Nov. 3, 2011.
(Continued)

*Primary Examiner* — Duane Smith
*Assistant Examiner* — Minh-Chau Pham
(74) *Attorney, Agent, or Firm* — Michael Best & Friedrich LLP

(57) ABSTRACT

A vacuum cleaner with bag mount and disposable bag is described. In some embodiments, the vacuum bag may include a semi-permeable dirt bag having a top edge, a generally flat collar having a top edge, and a first opening in the collar configured to accept a dirty air nozzle, where the top edge of the vacuum bag does not extend beyond the top edge of the collar. In some embodiments, the vacuum cleaner may include a dirty air nozzle, a vacuum bag having a substantially rigid collar including a dirty air opening, and at least one void used for alignment of the collar; a mounting member releasably connected to the vacuum cleaner and movable between a loading position and a fully closed position, and a latch to releasably retain a top edge of the collar to keep the mounting member in the fully closed position.

9 Claims, 9 Drawing Sheets

(51) Int. Cl.
*A47L 5/30* (2006.01)
*A47L 9/00* (2006.01)
*A47L 9/04* (2006.01)
*A47L 9/12* (2006.01)
*A47L 9/24* (2006.01)
*A47L 9/28* (2006.01)
*A47L 9/32* (2006.01)

(52) U.S. Cl.
CPC .............. *A47L 9/1445* (2013.01); *A47L 9/242* (2013.01); *A47L 9/2857* (2013.01); *A47L 9/325* (2013.01)

(56) References Cited

U.S. PATENT DOCUMENTS

| | | | |
|---|---|---|---|
| 1,140,992 A | 5/1915 | Martin | |
| 1,210,522 A | 1/1917 | Orr | |
| 1,282,548 A | 10/1918 | Reamer | |
| 1,286,115 A | 11/1918 | Rosenfield | |
| 1,288,312 A | 12/1918 | Wagner | |
| 1,437,996 A | 12/1922 | Robertson | |
| 1,530,575 A | 3/1925 | Pearl | |
| 1,556,021 A | 10/1925 | Orr | |
| 1,587,794 A | 6/1926 | O'Brien | |
| 1,591,325 A | 7/1926 | Kirby | |
| 1,647,292 A | 11/1927 | Hill | |
| 1,727,922 A | 9/1929 | Adams | |
| 1,843,901 A | 2/1932 | Pardee | |
| 1,879,710 A | 9/1932 | Reddig | |
| 1,903,855 A | 4/1933 | Townsend | |
| 1,918,695 A | 7/1933 | Gilbert | |
| 2,017,905 A | 10/1935 | Kitto | |
| 2,028,090 A | 1/1936 | Frantz | |
| 2,031,911 A | 2/1936 | Smellie | |
| 2,044,830 A | 6/1936 | Carlstedt | |
| 2,058,371 A | 10/1936 | Roosen | |
| 2,093,748 A | 9/1937 | Becker | |
| 2,128,525 A | 8/1938 | Dyer | |
| 2,202,999 A | 6/1940 | Smellie | |
| 2,244,165 A | 6/1941 | MacFarland et al. | |
| 2,287,515 A | 6/1942 | Dow et al. | |
| 2,343,056 A | 2/1944 | Harlett | |
| 3,724,179 A | 4/1973 | Leinfelt | |
| D288,016 S | 1/1987 | Watkins et al. | |
| 4,738,697 A | 4/1988 | Westergren | |
| 5,544,385 A * | 8/1996 | Jailor et al. | 15/350 |
| 5,613,989 A * | 3/1997 | Bosses | 55/367 |
| 5,688,298 A * | 11/1997 | Bosses | 55/367 |
| 5,935,280 A * | 8/1999 | Lee | 55/378 |
| 6,033,451 A * | 3/2000 | Fish et al. | 55/374 |
| D426,356 S | 6/2000 | Tsuruha | |
| 6,406,507 B1 * | 6/2002 | Paterson et al. | 55/378 |
| D462,814 S | 9/2002 | Sugimoto | |
| D498,887 S | 11/2004 | Kent | |
| 7,024,724 B2 * | 4/2006 | Ponjican et al. | 15/347 |
| D534,324 S | 12/2006 | Dyson et al. | |
| D544,158 S | 6/2007 | Bobrosky | |
| 7,258,709 B2 * | 8/2007 | Ponjican et al. | 55/374 |
| D570,561 S | 6/2008 | Dyson et al. | |
| D591,016 S | 4/2009 | Dyson et al. | |
| D596,360 S | 7/2009 | Dyson et al. | |
| 2006/0242787 A1 * | 11/2006 | Bosses | 15/352 |
| 2007/0074494 A1 * | 4/2007 | Bosses | 55/373 |
| 2007/0209145 A1 | 9/2007 | Tullett | |
| 2008/0022486 A1 | 1/2008 | Burlington | |
| 2009/0089966 A1 * | 4/2009 | Sohn et al. | 15/350 |

OTHER PUBLICATIONS

GB1218849.6 Search Report dated Nov. 25, 2014 (2 pages).

* cited by examiner

DISPOSABLE BAG AND A DISPOSABLE BAG MOUNT BRACKET FOR AN UPRIGHT VACUUM CLEANER

TECHNICAL FIELD

The present teachings are directed toward the improved cleaning and durability capabilities of upright vacuum cleaners. In particular, the disclosure relates to upright vacuum cleaner bag mounts and disposable bags.

BACKGROUND

A need has been recognized in the vacuum cleaner industry for an upright vacuum cleaner that has increased longevity and lighter weight.
Prior art upright vacuum cleaners often have multiple parts for dirty air paths, handles, and bag mounts. Use of multiple complicated parts increases the materials used for production, ultimately driving up production costs. Increasing the number of internal features within a vacuum cleaner also increases the likelihood that internal parts will fail.

SUMMARY

A method for installing a vacuum bag, comprising inserting a collar of the vacuum bag into a mounting member, rotating the mounting member from a loading position towards a closed position, allowing the mounting member to reach a fully closed position when the collar of the vacuum bag is in a correct orientation by passing at least one protrusion through a corresponding void in the collar where the at least one protrusion is in addition to a dirty air nozzle, and latching the collar when the mounting member is disposed into the fully closed position is described.

In some embodiments, the method further comprises preventing the mounting member from reaching the fully closed position when the collar of the vacuum bag is in an incorrect orientation by interfering with a solid area of the collar with the at least one protrusion. In some embodiments, the collar is inserted into a channel in the mounting member. In some embodiments, the collar comprises a flat stock of a generally stiff material. In some embodiments, the collar includes a plurality of voids separate from the dirty air opening for engaging at least one retainer member on a bag mount.

According to various embodiments, a vacuum bag comprising a semi-permeable dirt bag having a top edge, a generally flat collar having a top edge and a first opening in the collar configured to accept a dirty air nozzle, where the top edge of the vacuum bag is coextensive with or does not extend beyond the top edge of the collar.

In some embodiments, the vacuum bag further comprises a second opening in the collar elongated in a first direction, a third opening in the collar elongated in a second direction where the second and third openings are configured to allow the vacuum bag to be moved into a fully installed position onto the dirty air nozzle when the collar is in a correct orientation. In some embodiments, the vacuum bag further comprises an air impermeable membrane disposed opposite the first opening within the semi-permeable bag.

In some embodiments, the top edge of the collar comprises a chamfered corner of the collar. In some embodiments, the collar further includes an elastic seal surrounding the first opening. In some embodiments, the collar further includes a sliding panel that slides between an open position and a closed position over the first opening. In some embodiments, the collar further includes a positive stop limiting the movement of the sliding panel. In some embodiments, the collar further includes a retainer opening that accepts a retainer member on a bag mount.

According to various embodiments, a vacuum cleaner comprising a dirty air nozzle, a vacuum bag having a substantially rigid collar including a dirty air opening, and at least one void in addition to the dirty air opening, wherein the at least one void is used for alignment of the collar, a mounting member releasably connected to the vacuum cleaner and movable between a loading position and a fully closed position in which the dirty air nozzle engages the dirty air opening in the collar of the vacuum bag, and a latch disposed adjacent to the dirty air nozzle and operable to releasably retain a top edge of the substantially rigid collar to keep the mounting member in the fully closed position is described.

In some embodiments, the vacuum cleaner further comprises a stop that limits the mounting member from moving past the loading position. In some embodiments, the mounting member is coextensive with or does not extend past the top edge of the collar. In some embodiments, the vacuum cleaner further comprises a retainer member adjacent the dirty air nozzle for engaging a retainer opening in the collar. In some embodiments, the latch comprises a hook. In some embodiments, the top edge of the vacuum bag does not extend beyond the top edge of the collar.

BRIEF DESCRIPTION OF THE DRAWINGS

The same reference number represents the same element on all drawings. It should be noted that the drawings are not necessarily to scale. The foregoing and other objects, aspects, and advantages are better understood from the following detailed description of a preferred embodiment of the invention with reference to the drawings, in which.

DETAILED DESCRIPTION

The present teachings provide an upright vacuum cleaner including a vacuum cleaner base providing improved cleaning features and longevity. The structure of a vacuum cleaner can comprise a handle, body, base, and a wheel mount capable of housing a motor. The placement of the motor within the wheel mount reduces the weight of the vacuum cleaner, thereby reducing manufacturing costs. Increased wheel diameter makes the vacuum cleaner extremely maneuverable, thereby making the unit easy and light for a consumer to use.

Figure 1:
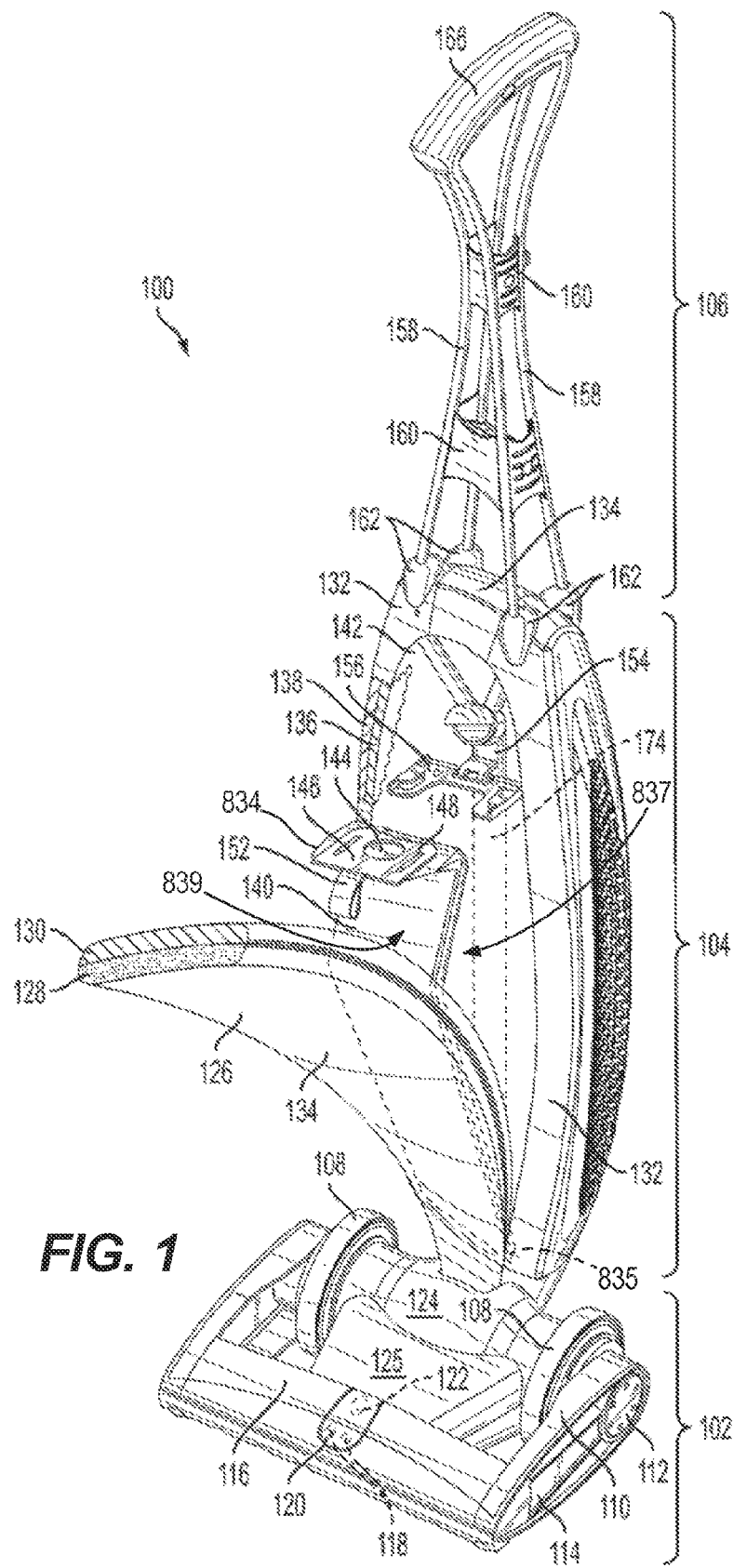
FIG. 1 illustrates a front prospective view of one embodiment of an upright vacuum cleaner.
Figure 2:
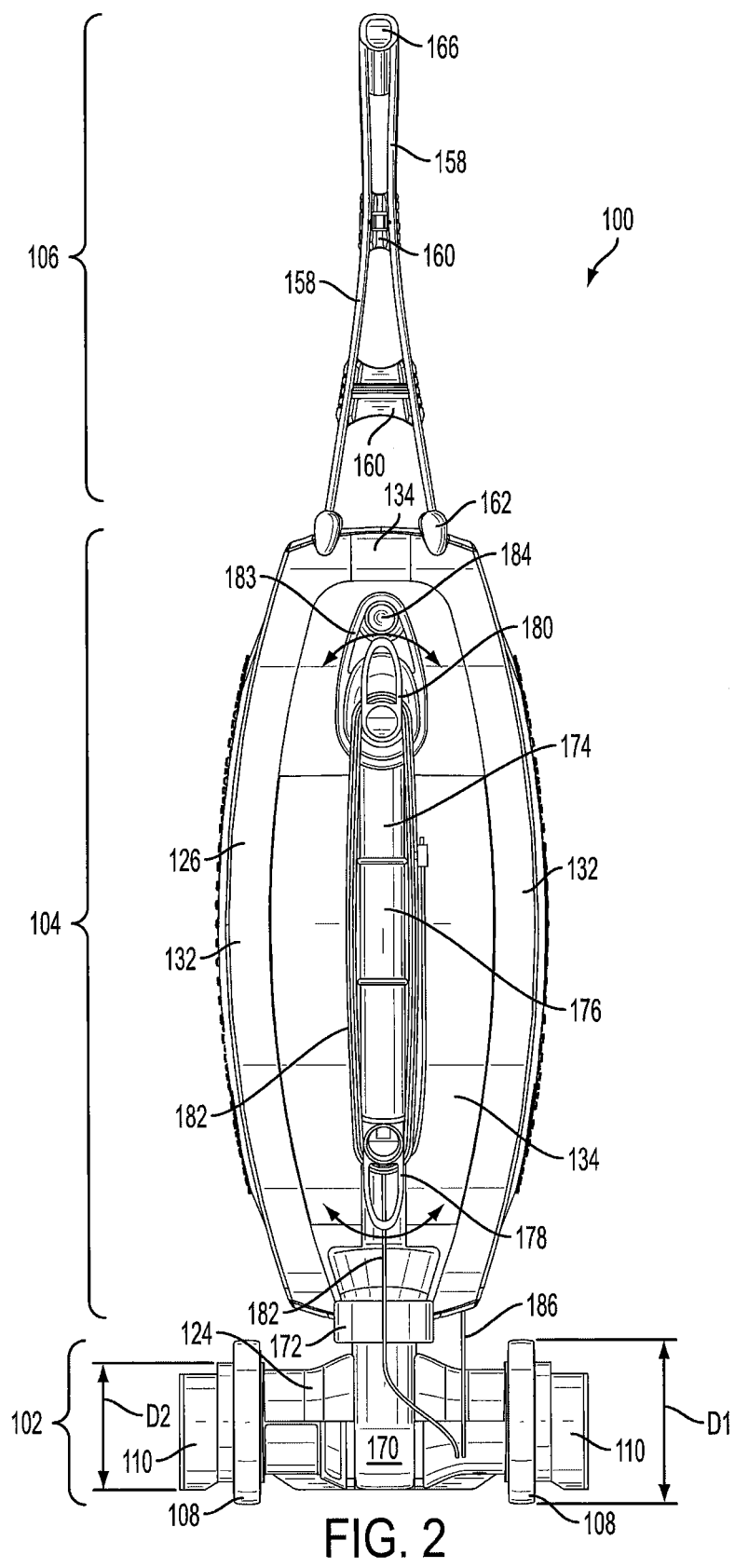
FIG. 2 illustrates a rear view of one embodiment of an upright vacuum cleaner.
Figure 3:
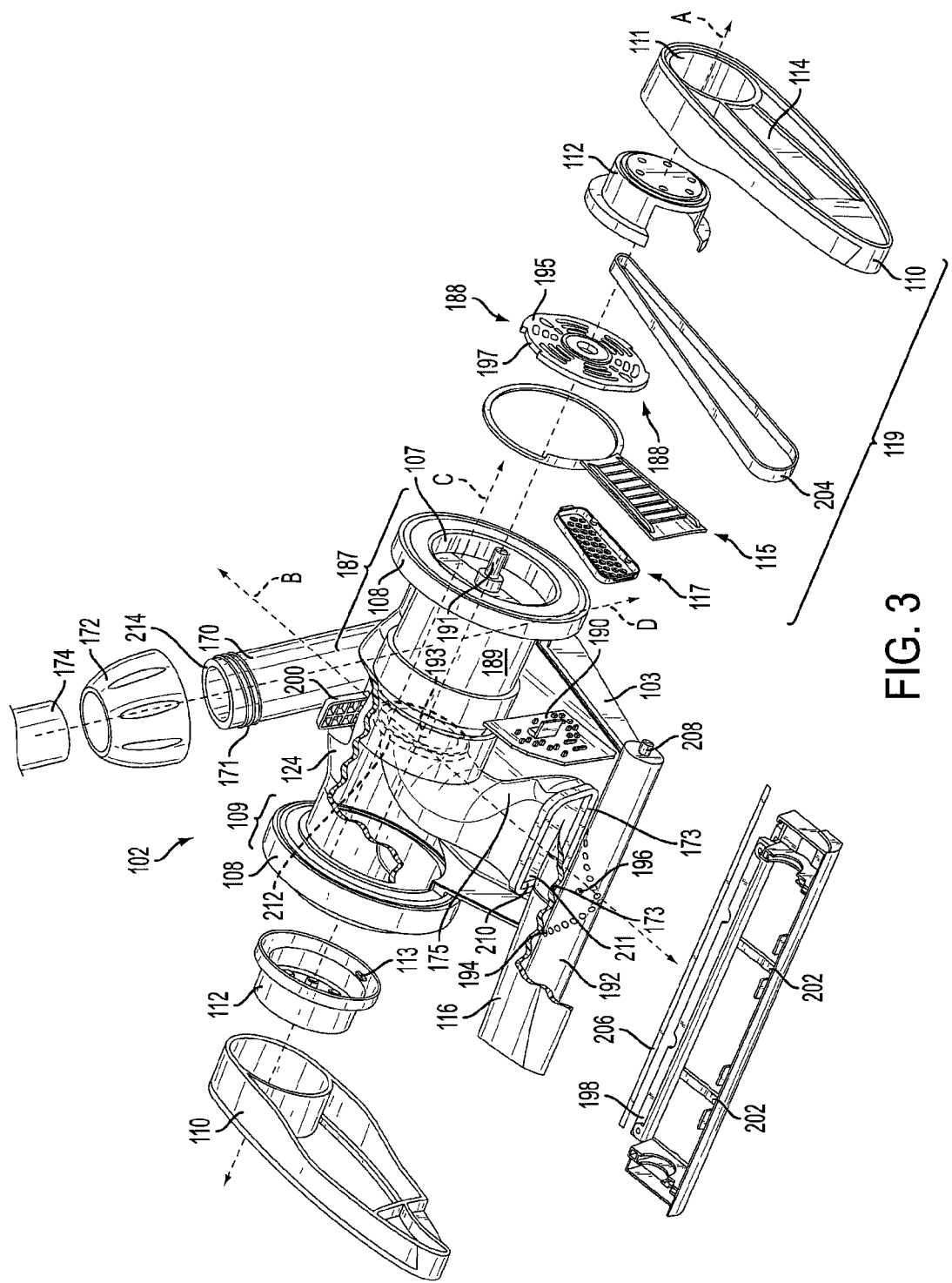
FIG. 3 illustrates the interior of the base of an upright vacuum cleaner according to one embodiment.

FIGS. 1 and 2 illustrate an exemplary embodiment of an upright vacuum cleaner 100. A vacuum cleaner base 102 can be connected to a dust collection assembly 104 and a handle portion 106. Vacuum cleaner base 102 can further comprise wheels 108, a beater bar housing 116, and a window/light housing cover 120 enclosing a light emitting diode (118) and a Hall Effect sensor 122 for improved cleaning capabilities of the upright vacuum cleaner unit. Vacuum cleaner base 102 has a vacuum cleaner base top cover 124 and air path cover 125 which may enclose the motor and other internal components of vacuum cleaner base 102. The sides of vacuum cleaner base 102 may be capped with tracks 110, which protect the sides of vacuum cleaner base 102, and stabilize the vacuum cleaner base 102 by connecting the rear portion of the vacuum cleaner base 102 with the front portion enclosing the beater bar (see FIG. 3). Tracks 110 can be attached to vacuum cleaner base 102 via wheel hub 112. Tracks 110 can also enclose a motor shaft (see FIG. 3) and may include a drive belt housing portion 114 which can enclose a beater bar drive belt (FIG. 3). Tracks 110 can be made of any suitable material, including but not limited to polymers, plastics, thermoplastics, elastomeric plastics, metals or combinations thereof.

Dust collection assembly 104 can comprise a dust collection assembly outer housing 126. In one embodiment, dust collection assembly outer housing 126 may be a flexible, semi-flexible, or semi-rigid bag. In one embodiment, dust collection assembly 104 can comprise a cyclonic separator. In some embodiments, discrete sections of dust collection assembly outer housing 126 may comprise air impermeable materials. In one embodiment, a front section 134 is air permeable. This permits exhaust of cleaned air and allows the flap to bend. In one embodiment, a side-wall section 132 is air impermeable and semi-rigid. As such side-wall section 132 can keep a desired shape without having undue weight and manufacturing cost. In some embodiments, vacuum cleaner 100 includes an outer bag stabilization tab 200 (shown in FIG. 3) that secures dust collection assembly outer housing 126 to vacuum cleaner base 102 and stabilizes it.

In this embodiment, front section 134 is shown as an air permeable semi-flexible bag that comprises an outer layer 128 and an inner layer 130. Inner layer 130 can be made of any material capable of providing a flexible, semi-flexible or semi-rigid inner layer. Examples of suitable materials include thermoplastics (TPE) or elastomerics, including thermoplastic or elastomeric polyurethane, polyurea, polystyrene, polyolefin, ethylene-vinyl acetate (EVA) or other thermoplastics or elastomers as known in the art. Outer layer 128 can be made of any material capable of providing a flexible or semi-flexible cloth-layer. Examples of suitable materials for outer layer 128 include polypropylene, nylon, polyester or rayon, etc. as known in the art.

In this embodiment, section 132 is shown as an air impermeable semi-flexible bag that comprises an outer layer 138 and an inner layer 136. Inner layer 136 can be made of any material capable of providing a flexible, semi-flexible or semi-rigid inner layer. Examples of suitable materials include thermoplastics (TPE) or elastomerics, including thermoplastic or elastomeric polyurethane, polyurea, polystyrene, polyolefin, ethylene-vinyl acetate (EVA) or other thermoplastics or elastomers as known in the art. Outer layer 136 can be made of any material capable of providing a flexible or semi-flexible cloth-layer. Examples of suitable materials for outer layer 136 include polypropylene, nylon, polyester or rayon, etc. as known in the art.

Dust collection assembly outer housing 126 may include an opening or aperture 142 to allow for the removal of collected debris. In some embodiments, the collected debris is contained in a filter bag 140 after traveling through dirty air tube 174. The filter bag 140 includes a top edge 834, a bottom edge 835 opposite the top edge 834, a first side surface 837 that extends from the top edge 834 to the bottom edge 835, and a second side surface 839 directly opposed to the first side surface 837. The second side surface 839 extends from the top edge 834 to the bottom edge 835 (FIG. 1). Filter bag 140 may comprise a rigid or semi-rigid collar 146 that includes a top edge 832, a bottom edge 830 opposite the top edge 832, an inlet 144, slots 148, and a pull tab 152. The collar 146 is located on the first side surface 837 (FIG. 8) of the filter bag 140 such that the filter bag 140 extends beyond the bottom edge 830 of the collar 146. Collar 146 can slide into bag mount 156 of bag mount assembly 154. Additional details regarding bag mount assembly 154 can be found in FIG. 8. In some embodiments, dust collection assembly can further include one or more filters for cleaning dirty air. Such filters can include one or more wire, mesh, carbon, activated charcoal, filter paper, or HEPA filters. The filters can be included as portions of dust collection outer housing 126, as a portion of filter bag 140, or a combination thereof.

Handle 106 can comprise two handle supports 158, which are connected via handle brackets 160 and grip portion 166. The handle supports 158 may be connected to a top portion of the dust collection assembly 104 via attachment posts (FIG. 5A) which can be covered by attachment post covers 162. Handle 106 can be made from any material with a suitable strength-to-weight ratio. In one embodiment, magnesium is a suitable material for handle 106. In one embodiment, materials such as carbon fibers (e.g. graphite) or titanium or other alloys may provide suitable strength, be light-weight, and have low production costs. Depending on their implementation and design arrangement, items such as aluminum, steel and iron may not have both suitable strength and light weight requirements. Additionally, aluminum, steel and iron may possibly have increased production costs, when factoring in costs for raw materials and shipping are included. However, these materials are not contemplated to be exclusively outside of all embodiments of the various inventions described herein.

Figure 9:
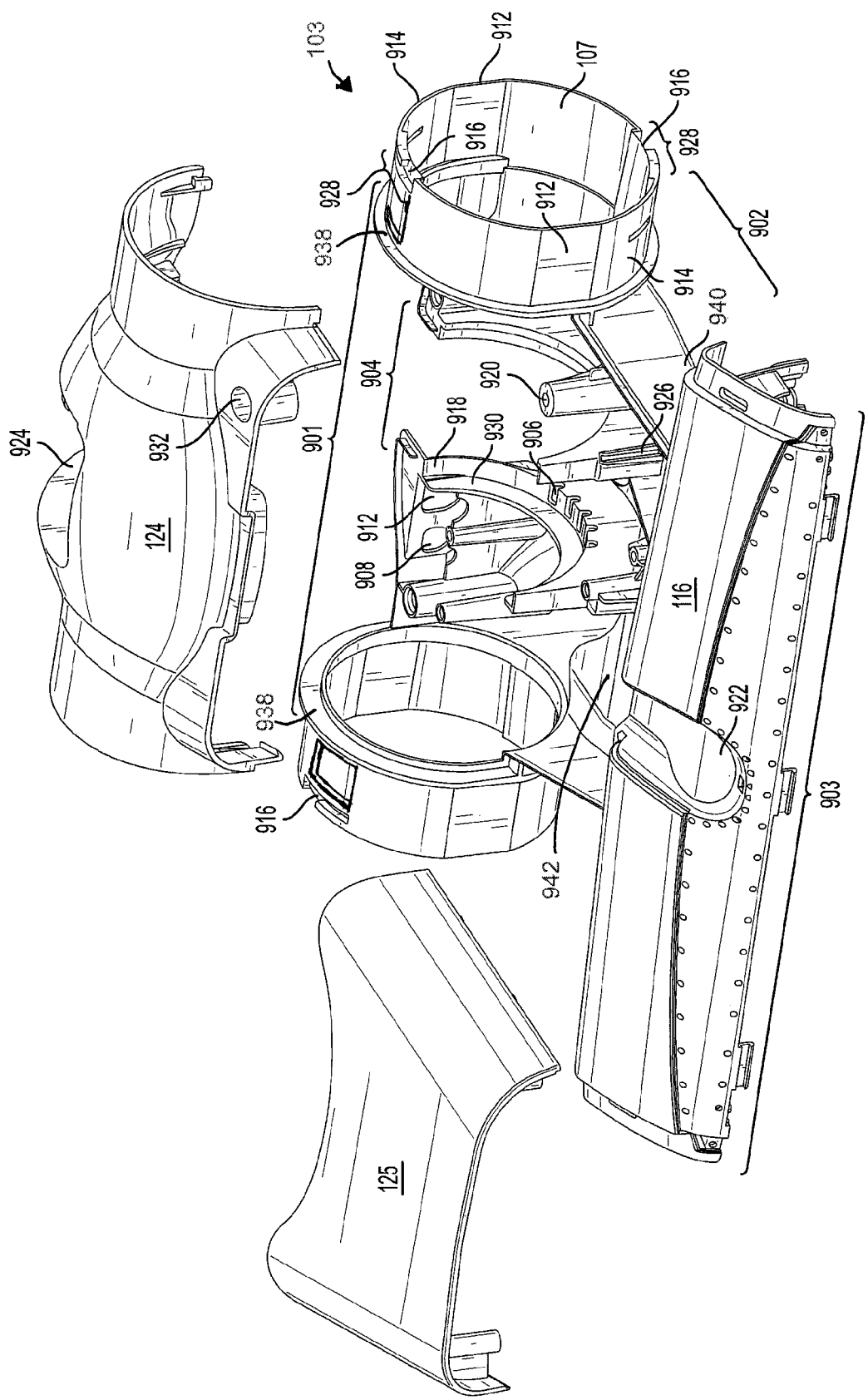
FIG. 9 illustrates the base portion of a vacuum cleaner according to one embodiment.

As shown in FIG. 2, vacuum 100 can include a power cord 182 which provides power to a motor. The power cord can be stored around lower cord hook 178 and upper cord hook 180 for easy storage and management. Power cord 182 and cord 186 can enter into vacuum cleaner base 102 through parallel apertures (FIG. 9). Power cord 182 supplies alternating current (AC) to vacuum cleaner base 102 and a motor assembly 187 (FIG. 3). Cord 186 can convey user commands to a control board in base housing 102. For example, cord 186 can convey a user request to turn on and off the power to the vacuum cleaner by pressing power button 184. Cord 186 may provide power for signaling within the vacuum (e.g., power on/off, speed control of a beater bar, LED lights on/off, and brush on/off) between a control button within a handle 106, for example, power button 184.

Dirty air tube 174 can provide multiple functions besides conveying dirty air from the base to dust collection assembly 104. Dirty air tube 174 can be a part of the handle used to move the vacuum back and forth over the floor. Dirty air tube 174 can comprise a handle region 176 which allows a convenient place for a user to grip and lift vacuum cleaner 100. Locking collar 172, located on a distal end of dirty air tube 174, includes internal threads (not shown) which are received on a distal end of scroll/volute 170. By joining dirty air tube 174 to scroll/volute 170, a continuous dirty air path is created allowing dirt and debris to be transferred from vacuum base 102 up and into dust collection assembly 104.

FIG. 3 is an interior view of an exemplary embodiment of vacuum cleaner base 102. A dirty air path is created when dirty air travels through sole plate 198 and beater bar housing 116, out of beater bar housing air outlet 210 into dirty air intake duct 175, and into scroll/volute 170 via a scroll/volute air inlet 212. Dirty air intake duct 175 is directly connected to beater bar housing 116 via dirty air intake gasket 173 which provides an air tight seal between dirty air intake duct 175 and beater bar housing 116. Dirty air intake duct 175 can connect the volute air inlet 212 and the air outlet of the beater bar housing 210. In some embodiments, dirty air intake duct 172 flairs as dirty air intake duct approaches the beater bar housing 116. In some embodiments, scroll/volute 170 can include a volute air inlet 212 disposed parallel to beater bar housing 116. In some embodiments, volute air outlet 214 can be orthogonal to the beater bar housing 116. Threads 171 on an exterior portion of a distal end of scroll/volute 170 are received by locking collar 172 on dirty air tube 174.

As illustrated by Axis "B," beater bar housing air outlet 210 and the volute air outlet 214 are substantially collinear. As illustrated by axis "C", in some embodiments, the center of the volute air inlet 212 and a center of the beater bar housing air outlet 210 are substantially orthogonal. A length of the dirty air path of the vacuum cleaner is kept at a minimum. The reduction of the air path length reduces the resistance within the air path. Dirty air intake may occur at beater bar outlet/air duct inlet 211. As a result, motor assembly 187 requires less power to move adequate air within the vacuum, and suction is more evenly distributed over beater bar 182. Preferably, motor assembly 187 in vacuum 100 is capable of producing an average maximum of about 50 cubic feet per minute (CFM) air flow, when operated in air, measured at beater bar outlet/air duct inlet 211. Preferably, the motor assembly 187 in vacuum 100 at that maximum CFM utilizes an about 416 wattage motor. Prior art vacuum cleaners must use a larger wattage motor in order to generate similar air movement at intake and blower. Thus, vacuum cleaner 100 utilizes a smaller motor in order to generate adequate air movement. Reducing the size and power of the vacuum motor, while maintaining cleaning capability reduces the weight of the vacuum and operative costs. As such, the convenience and ease of use of the vacuum is increased for the consumer. Those of ordinary skill in the art will understand that not every embodiment necessarily includes these features.

Vacuum cleaner base 102 can comprise a track 110, a wheel hub 112, a vacuum cleaner base plate 103, a motor assembly 187, a wheel 108 disposed on a wheel assembly 109, and vacuum cleaner base cover 124. Vacuum cleaner base cover 124 can be secured to vacuum cleaner base plate 103 via fasteners (not shown). Assembly of tracks 110, wheel hubs 112, and wheels can be secured via a combination of friction fit and twist-to-lock feature. Wheel hubs 112 can be received within a track hub receiving portion 111 of track 110. Wheel hubs 112 can include locking tabs 113 which are received within locking slots (FIG. 9) on wheel mount 107. Once locking tabs 113 are received within locking slots, the wheel hub 112 can be rotated to lock the wheel hubs 112 and tracks 110 into place. Wheel assembly 109 can be secured to an outer circumference portion of wheel mount 107.

In some embodiments, vacuum cleaner base plate 103 can be a single piece or unibody construction. Vacuum cleaner base plate 103 includes beater bar housing 116 and wheel mount 107 (FIG. 9). Motor assembly 187 can be disposed within wheel mount 107. Motor assembly 187 can be held within wheel mount 107 by holding it within a motor cradle and via friction fit. In other words, in this illustrative example, motor assembly 187 requires no additional fasteners (screws, clamps, rivets, etc.) in order for the motor assembly 187 to remain secured to and within vacuum cleaner 100. In this arrangement, a reduction in the use of fasteners can be achieved by way of configuring the motor assembly 187, base plate 103, wheel mount 107, or other structural component to physically mate and hold the motor assembly 187 when the components are assembled when manufacturing the vacuum. Axis line "A" of FIG. 3 shows how wheel assembly 109, motor assembly 87, and wheel mount 107 can be concentric.

Airflow generated by an impeller rotated by motor assembly 187 draws air in from dirty air intake duct 175 and exhausts the air through scroll/volute 170 into bag assembly 104 (FIGS. 1 and 2) where debris can be contained. The impeller (not shown) is driven by motor shaft 193 and is housed in scroll/volute 170. Motor assembly 187 can also drive beater bar 192 via a flexible belt 204. Prior art vacuum cleaner flexible stretch type belts fail before 100 hours. In some embodiments, flexible belt 204 exceeds 100 use hours before breakage. In some embodiments, a flexible belt use exceeds the mean time between failure (MTBF) of the vacuum cleaner itself. Thus, flexible belts may never have to be replaced during the lifetime of the vacuum. In some embodiments, the belts are circular belts or serpentine belts. In a preferred embodiment, belt 204 is a corded belt. In some embodiments the belt can include a flat or length-wise grooved surface. If the belt includes a grooved surface, the surface can include 1, 2, 3, 4, 5 or more grooves. The belts can be made of materials known in the art, including, but not limited to rubber, nylon, plastics, and polymers such as polybutadiene, and polyamide, among others. In some embodiments, flexible belts have little or no stretch. In some embodiments, the flexible can be installed under tension. In a preferred embodiment, flexible belt 204 does not stretch more than 3%. In a preferred embodiment, flexible belt 204 is about a 20-25 lb load capacity belt.

Vacuum cleaner base 102 can also include a belt housing assembly 119 which can comprise belt housing inner cover 115 and a belt housing outer cover 114. When belt housing inner cover 115 and belt housing outer cover 114 are assembled they enclose flexible belt 204. During vacuum cleaner use, air is drawn into the belt housing assembly 119 and over flexible belt 204 cooling flexible belt 204. By cooling flexible belt 204 during use, the integrity of flexible belt 204 is preserved, prolonging the MTBF of flexible belt 204. A belt housing filter cover 117 encloses an air filter onto belt housing assembly 119—cleaning the air prior to the air is drawn into and across motor 189.

Motor assembly 187 can comprise a motor 189, motor belt shaft 191, and motor end plate 195. Motor end plate 195 can include one or more motor end plate notches 197 and flat planar edges 188, which allow motor end plate 195 to be held with friction fit into the wheel mount 107. Motor end plate 195 can also propel air over motor assembly 187 disposed within wheel mount 107. Advantageously, air flow generated by motor assembly 187 can cool motor assembly 187, thereby reducing the amount of long term heat exposure to the motor assembly. By reducing the amount of stress on motor assembly 187 due to heat, the MTBF of motor assembly 187 can be greatly increased, resulting in longer life of the vacuum cleaner.

Circuit board 190 can provide electrical current to one or more of a motor assembly 187, LED lights 118 (FIG. 1) or a Hall Effect sensor 122 (FIG. 1). Hall Effect sensor 122 can detect a rotational speed of a beater bar 192. A magnetic metal ball 196 embedded in beater bar 192 can be used to activate the Hall Effect sensor 122, thus detecting the beater bar rotation speed. A beater bar 192 that is tangled or stuck on debris can place a large load on motor assembly 187 or burn it out. A tangled or stuck beater bar can cause strain upon drive belt 204. When circuit board 190 detects a slowed rotational movement of beater bar 192, circuit board 190 can shut down power to motor assembly 187. In other words, if beater bar 192 gets stuck, power to motor assembly 187 is shut off, thereby preventing motor assembly 187 from overheating and drive belt 204 from breaking. In a preferred embodiment, if beater bar 192 falls below 120 rotations per minute, power to motor assembly 187 is shut down. Circuit board 190 can also provide electrical current to various other components of the vacuum cleaner, such as LED lights 118 (FIG. 1), motorized handheld attachments, temperature sensors, altitude sensors, magnetic sensors, indicator lights, etc.

Vacuum cleaner 100 and circuit board 190 can comprise multiple sensors and switches. In a broad sense, a "sensor" as used herein, is a device capable of receiving a signal or stimulus (electrical, temperature, time, etc.) and responds to it in a specific manner (opens or closes a circuit, etc.). A "switch," as used herein, can be a mechanical or electrical device for making or breaking or changing the connections in a circuit. In some embodiments sensors can be switches. In other embodiments the sensors are connected to indicator lights or the like to inform a user of a malfunction or the need to perform a necessary function. Vacuum cleaner 100 or circuit board 190 can utilize flow blockage, light, temperature, "bag full" sensors, and handle attitude sensors. Signals from these sensors can aid the user in using and assessing various states of the vacuum. Sensors can comprise electric, magnetic, optical, gravity, etc., known in the art. Vacuum cleaner 100 or circuit board 190 can further comprise a "deadman" or "kill" switch which is capable of terminating power to the vacuum should the user become incapacitated.

Vacuum cleaner base 102 is supported by wheel assembly 109. Vacuum cleaner base 102 can also be supported by small front wheels (not shown). Base 102 generally glides over a cleaning surface, such as a floor. Vacuum cleaner base 102 can contact a cleaning surface, for example, when the cleaning surface is a deep shag carpet. Agitation devices, such as a beater bar 192, squeegee 206, and side brushes (not shown) can provide agitation of cleaning surfaces in order to dislodge and direct debris into dirty air intake 172. As mentioned above, beater bar 196 can be driven by motor assembly 187 via a flexible belt 204 or other mechanism. Anti-ingestion bars 202 in sole plate 198 prevent large sized items from being drawn into the dirty air intake duct 175. Beater bar 192 can include an arrangement of bristle tufts 194 that sweep the particulates into the dirty air intake duct 175. Flexible belt 204 can be disposed on beater bar shaft 208 to drive beater bar 192. In some embodiments, beater bar shaft 208 can include grooves to receive corresponding grooves disposed on flexible belt 204. Bristle tufts 194 can be arranged on the beater bar in many different orientations. The fibers of the bristles can be of substantially identical stiffness, diameter and geometry or of different stiffnesses, diameters and geometries as desired. The fibers of the bristles can be made of natural or synthetic materials, or combinations thereof, including but not limited to nylon, plastic, polymers, rubber, hair (e.g., boar's hair). In some embodiments, bristle tufts 194 can be arranged in a double or single helix pattern.

A double or single helix pattern can reverse its direction of rotation. The average length of the fibers of the bristle tufts can be from about 0.300 inches to about 0.500 inches. The average diameter of the fibers of the bristle tufts can be from about 0.008 inches to about 0.015 inches. Additionally, the bristle tufts can be angled out or placed non-orthogonally from the spindle to maximize the "embedded dirt" movement characteristics of the vacuum. The bristle tufts can be offset from the centerline about 0.08 inches to about 0.15 inches. In a preferred embodiment, the bristle tufts can comprise filaments comprising Nylon 6-6. The mean diameter of each filament can be about 0.012 inches. The mean amplitude of each filament can be about 0.022 inches. The mean tuft length of each filament can be about 0.370 inches. The tuft offset from centerline can be about 0.120 inches. In some embodiments, a single helix brush can be advantageously used in high shag carpets as its rotational speed is not inhibited to the same degree as the rotational speed of double helix brushroll.

Moment arm D can be co-linear with scroll/volute 170 and dirty air tube 174 and ultimately connected to handle 106. Moment arm D can be optionally disposed behind axis C. This effectively moves any force conveyed along moment arm D by the handle behind an axle defined by axis A. It is theorized that with an anterior moment arm D, a force applied to handle 106 transfers force through scroll/volute 170, causing scroll/volute to be pushed towards a cleaning surface rather than pushing vacuum cleaner base 102 towards the cleaning surface. As such, any downward component of the force applied to handle 106 does not push base 102 down also. This reduces a frictional force of base 102 against the cleaning surface. The resulting reduction in friction can provide a much easier vacuum to push and control for a user over a cleaning surface, and provides a "floating head."

Figure 4:
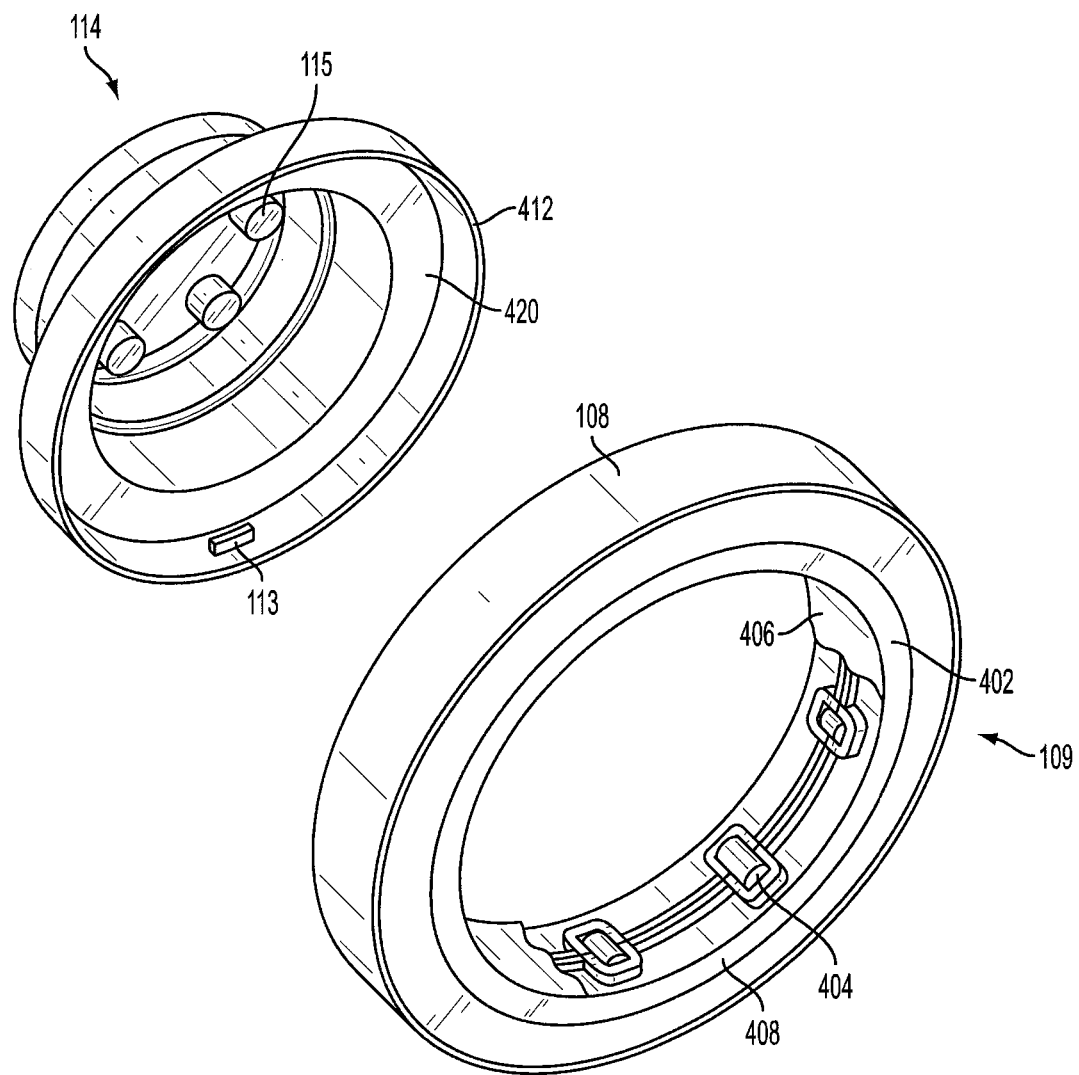
FIG. 4 illustrates a wheel and wheel hub of an upright vacuum cleaner according to one embodiment.

FIG. 4 illustrates an exemplary embodiment of a wheel assembly 109. Wheel assembly 109 can comprise wheel 108, a roller bearing comprising rollers 404, an inner race 406 and an outer race 408. Rollers 404 are encased by cage 410, forming an interior chamber in which rollers 404 rotate. Rollers 404 rotate around an outer surface of wheel mount 107 (FIGS. 3 and 9). Rollers 404 are shown as cylinders. However, it should be understood that rollers 404 can be any suitable shape including but not limited to spheres and ellipsoids. The number of rollers 404 that are included in wheel assembly 109 can vary, so long as the number provides a low coefficient of friction sufficient to allow wheel 108 to easily rotate around wheel mount 107 (FIGS. 3 and 9). In some embodiments, wheel assembly 109 can include 1, 2, 3, 4, 5, 6, 7, 8, 9, 10, 11, 12, 13, 14, 15, 16, 17, 18, 19, 20, 25, 30, 35, 40, 45, 50 or more rollers 404. In a preferred embodiment, wheel assembly includes 19 cylindrical rollers 404. For example, the wheel assembly 109 can include an even or odd number of rollers 404. In some examples, rollers 404 are equally spaced along the inner diameter of inner race 406. In some embodiments, rollers 404 are unequally spaced along the inner diameter of wheel assembly 109. Roller bearings can comprise any suitable material, including but not limited to steel or other metals, plastics or other polymers, or combinations thereof.

As mentioned above track hub 114 locks into wheel mount 107 (FIGS. 3 and 9) through track hub locking tabs 113. Track hub 114 can include track hub wells 115 which can be used to aid in rotating track hub 114 when locking or unlocking track hub 114 from wheel mount 107. Track hub 114 can also include planar rim 410 which can include lip 412 which supports track hub locking tab 113. Track hub 114 is shown as a circular shape. However, track hub 114 can be any suitable shape, so long as track hub includes locking tabs 113 in order to secure the track hub 114 to wheel mount 107. Track hub 114 can be full or partial—that is portions of track hub rim 210 and lip 412 can be removed as long as track hub includes locking tabs 113. For example as shown in FIG. 3, track hub 114 can have a portion of track hub rim 210 and lip 412 removed to accommodate belt 204. In some embodiments vacuum cleaner base 102 can include one or more vacuum operational components (e.g. motor assembly 187, circuit board 190, etc) positioned within a back portion of vacuum cleaner base 102, two or more wheel assemblies 109 and bearings 404, in which bearings 404 are in a rotational arrangement with wheel assemblies 109. In some embodiments, wheel assemblies 109 can include inner race 406, outer race 402, and bearings 404. In some embodiments, bearings 404 can rotate around an aperture in motor mount 107 to move wheel assembly 109. In some embodiments, wheel assembly 109 are positioned on a back portion of the vacuum cleaner base 102. In some embodiments the aperture of wheel mount 107 has a diameter that is at least greater than a height one of the operational components.

Also, as shown in FIGS. 3 and 9, wheel mounts 109 can be located within wheel mount portion 901, located in a rear portion of vacuum base 102. However, it should be understood that wheel mount portion 901 (including corresponding wheel mounts 107) can be located anywhere within vacuum cleaner base 102. For example, wheel mounts 107 may be located in a front portion of vacuum base 102 (e.g. in or near beater bar portion 903). Wheel mounts 107 may be located in a middle portion of vacuum base 102 (e.g. in or near passage portion 902). Vacuum cleaner 100 can include without limitation, one, two, three, four or more wheel mounts. In some embodiments, vacuum cleaner 100 can include odd numbers of wheel mounts 107 and even numbers of wheel mounts 107. As used herein, "operational component" and "functional component" are synonymous, and refer to any specific component of the vacuum. For example, motor assembly 187, beater bar 192, LED light 118, power cord 182, filter bag 140, wheel assembly 109, dust collection assembly 104, flexible belt 204 and scroll/volute 170 are all "operational components" and "functional components." The terms "operational components" and "functional components" can be used interchangeably.

Figure 5A:
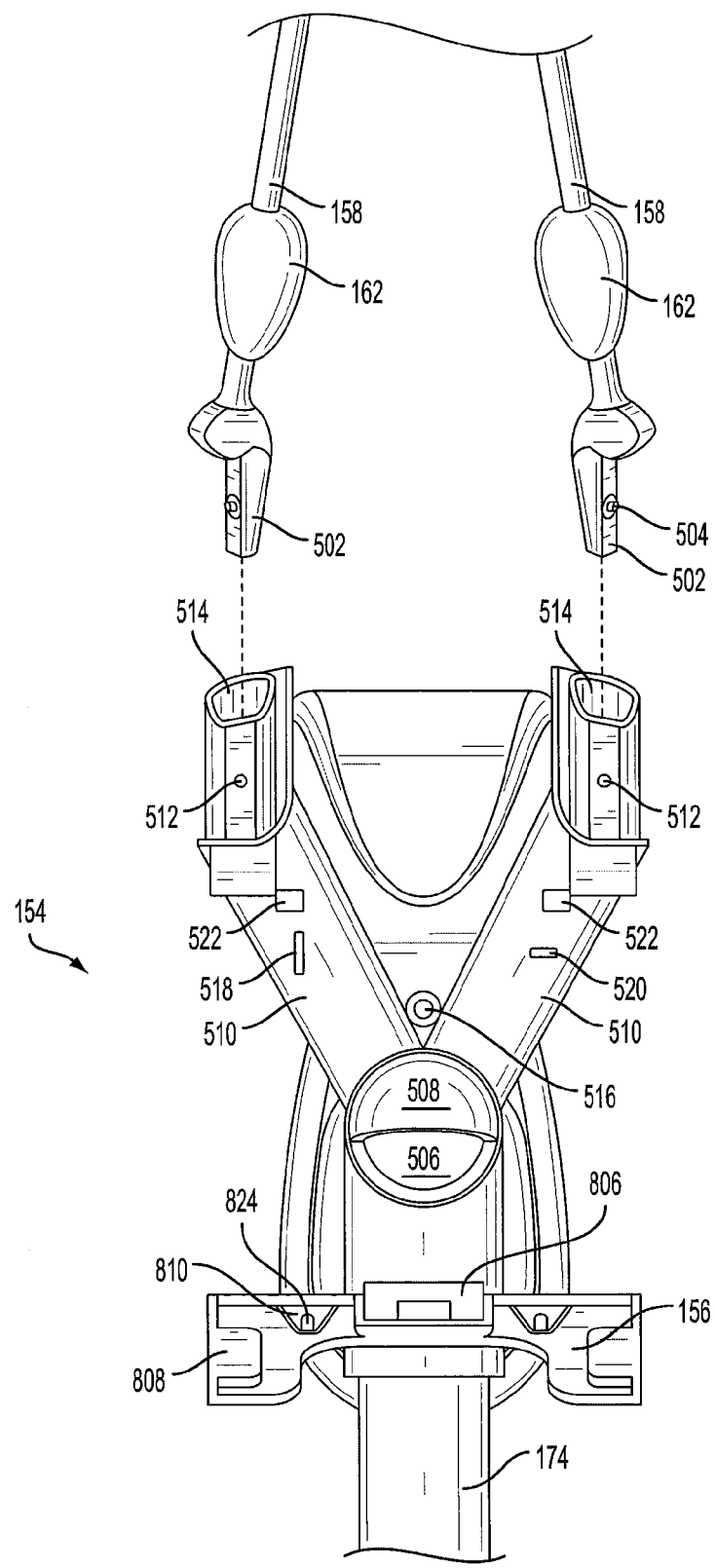
FIG. 5A illustrates the front view of the bag mount of an upright vacuum cleaner according to one embodiment.
Figure 5B:
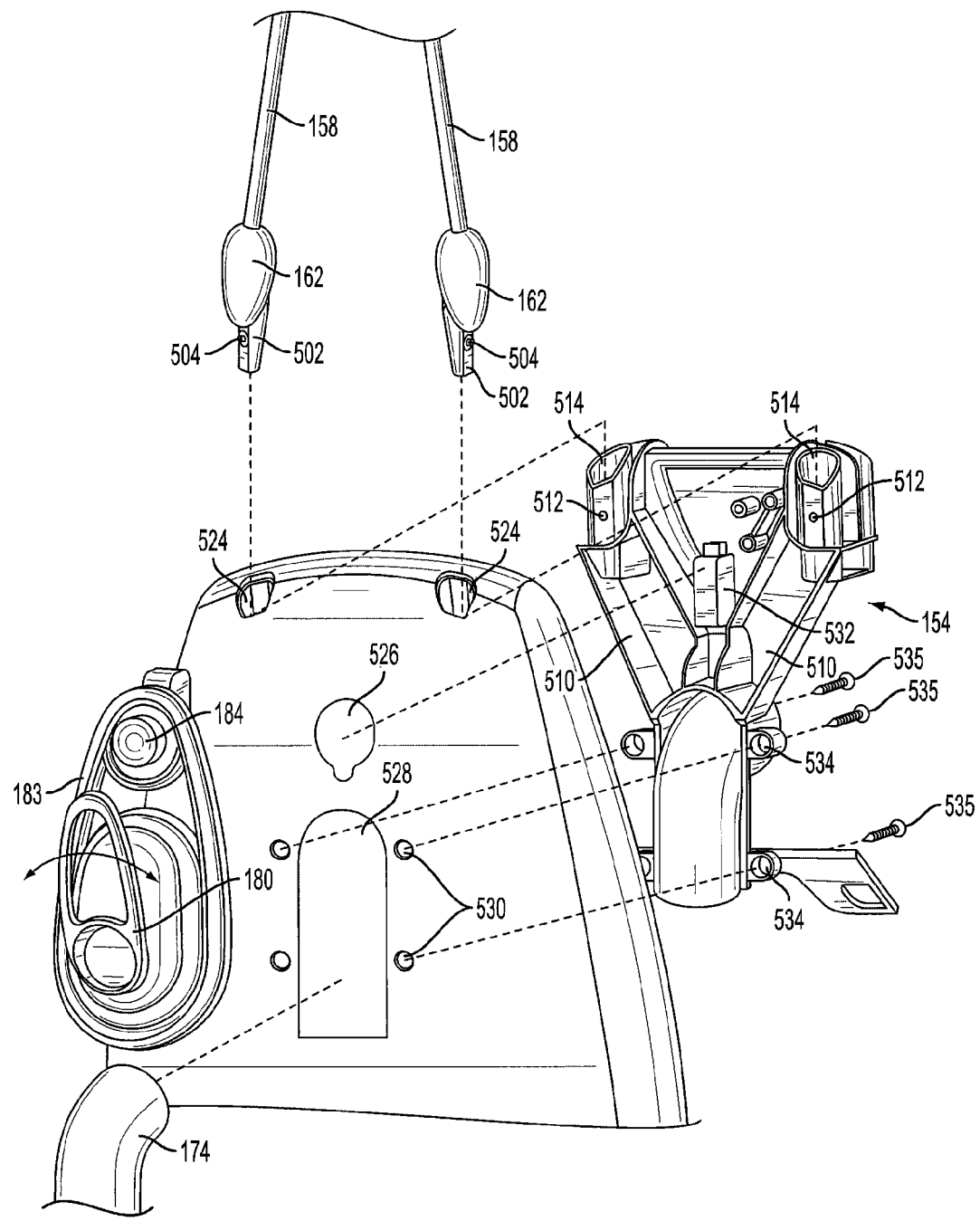
FIG. 5B illustrates a profile view of the back of the bag mount of an upright vacuum cleaner according to one embodiment.

In some embodiments, a structural junction can be implemented that can be a physical junction point for different functional components so as to position different components to be located generally physically adjacent to each other and to provide support for at least some of those components. For example, a support for the vacuum handle, a vacuum bag holder (e.g., attachment for connecting the bag to the dirty air tube), and a support for holding a power cord can be designed and implemented on the vacuum to have those functional components join together in an integrated assembly. If desired, a dirty air tube can be part of the assembly and can be used to substantially support the assembly. For example, through fastening, manufacturing or a combination thereof each functional component can be secured or attached to the other. For example, FIGS. 5A and 5B illustrate an exemplary embodiment of a front portion and rear portion, respectively, of bag mount 154 which can structurally and functionally connect the lower portions of vacuum cleaner 100—such as dirty air tube 174 and vacuum cleaner base 102—to the handle 104. Advantageously, the binding/attaching of dirty air tube 174 and vacuum cleaner base 102—to the handle 104 at bag mount 154 results in a multi-functional element that 1) receives the vacuum bags; 2) establishes an air path; 3) carries the electric cord; 4) transfers movement energy from one end of a vacuum to another; and 5) provides a convenient waist high location of a power switch. Bag mount 154 preferably uses less material and parts than prior art vacuums that utilize multiple parts that provide similar functions. In some embodiments, the integrated or unibody construction reduces production costs, inventory costs and fewer parts that can break over the lifetime of a vacuum. Bag mount 154 for example, can be made of a unibody construction, i.e., it is not an assembly but a single-molded piece.

Figure 8:
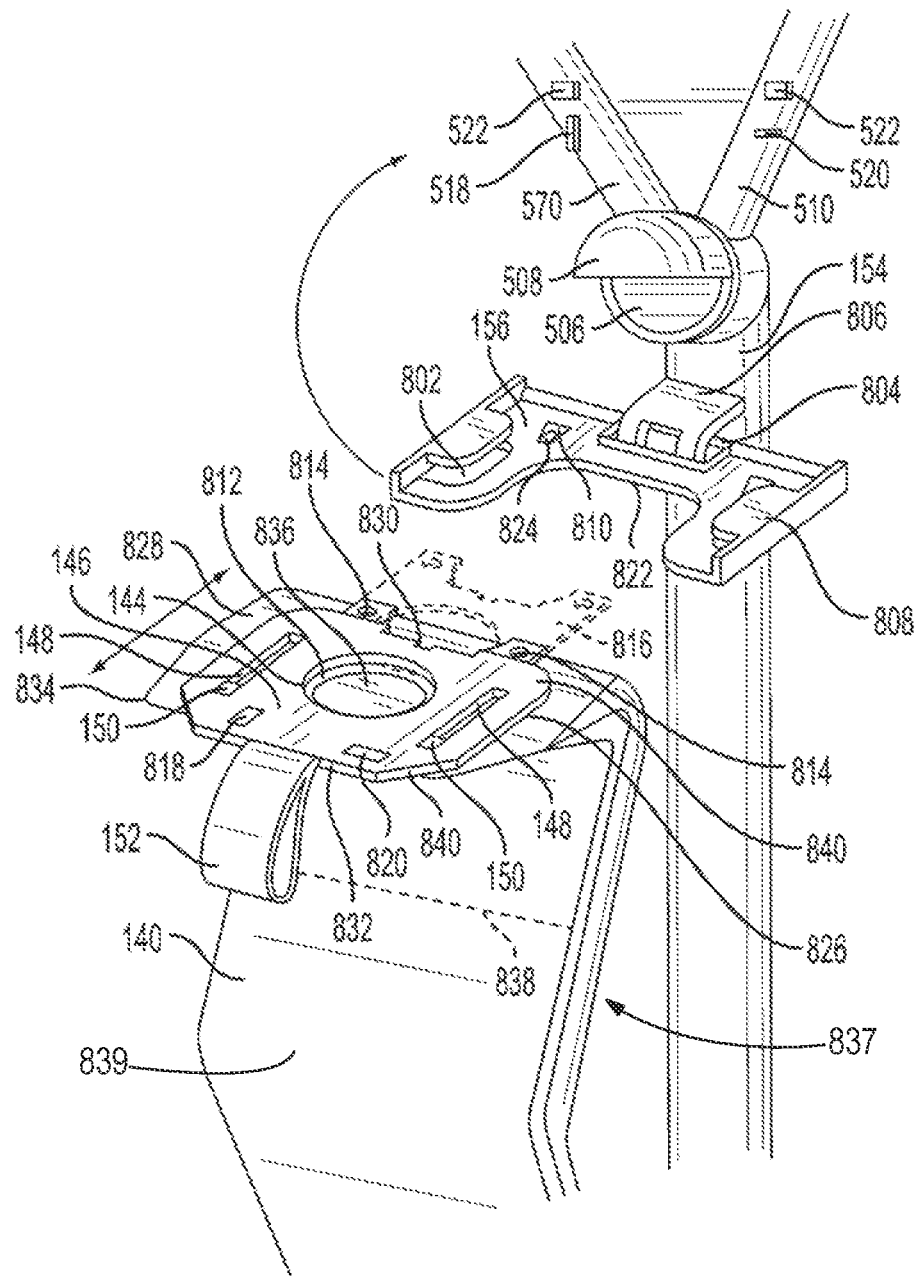
FIG. 8 illustrates the bag mount of an upright vacuum cleaner according to one embodiment.

FIG. 5A illustrates a front view of bag mount 154. Bag mount 154 receives dirty air from dirty air tube 174 which is connected to vacuum cleaner base (FIGS. 1 and 2). A distal end of bag mount 154 can include a handle post receiver 514. Distal ends of handle support 158 can include a handle attachment post 502. A spring lock 504 on handle attachment post 502 can be received in a corresponding locking hole 512 in a handle post receiver 514 to secure handle attachment post 502 to the vacuum cleaner. Handle attachment post 502 can be covered by handle attachment post cover 162. Bag mount support column 510 connects handle post receiver 514 and a bag mount dirty air intake 506. Bag mount support column 510 can include one or more of a bag mount collar hook latch or locking clip 522, a bag mount vertical locking key or protrusion 518, and a bag mount horizontal locking key or protrusion 520. Bag mount collar hook latch or locking clip 522, bag mount vertical locking key or protrusion 518, and bag mount horizontal locking key or protrusion 520 can be used to orient and secure filter bag 140 (See FIG. 8 for more details). Debris filled air from vacuum cleaner base 102 travels through dirty air tube 174 and through bag mount dirty air intake 506. Bag mount baffle 508 can change the direction of incoming air and direct it into a receiving filter bag 140 (FIG. 8). Fasteners (not shown) are received in bag mount fastening receiver 516 to secure bag mount 154 to dirty air tube 174.

Apertures through dust collection assembly 104 allow handle posts 502, bag mount 154 and dirty air tube 174 to be secured together for vacuum cleaner assembly as shown in FIG. 5B. In one example, handle attachment posts 502 can be received in handle post receivers 514 through handle apertures 524. In one example, fasteners 536 can be secured through fastener receiving apertures 534 and apertures 530 in dust collection assembly 104. This secures bag mount locking collar 183 to bag mount 154. An upper cord hook 180 and a power button 184 are disposed on or in bag mount locking collar 183. Power on/off button 184 makes electrical contact with micro-switch 532 through aperture 526 via a spring (not shown) when bag mount 154 is assembled to dust collection assembly 104. Dirty air tube 174 can be assembled to bag mount 154 through aperture 528 when bag mount 154 is assembled to dust collection assembly 104.

Figure 6:
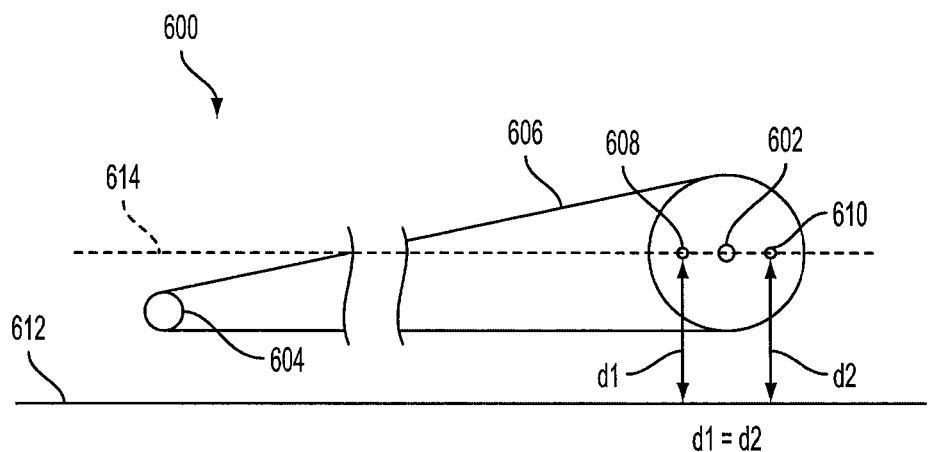
FIG. 6 illustrates the axis of motor mounts of prior art vacuum cleaners.

FIG. 6 illustrates on form of prior art motor mounts of vacuum cleaners. In this design, prior art motor mounts 608 and 610 of motors 601 are horizontal to cleaning surfaces 612. For example, prior art vacuum cleaners have a motor 601, a motor shaft 602 to drive a belt 606 that rotates a beater bar 604. As shown, motor mounts 608 and 610 are equidistance from a cleaning surface 612. In other words, the distance (d1) between motor mount 608 and cleaning surface, and the distance (d2) between motor mount 610 and cleaning surface 612 are the same (d1=d2). Thus, axis line 614 through motor mounts 608 and 610 is horizontal and parallel to cleaning surface 612.

Figure 7:
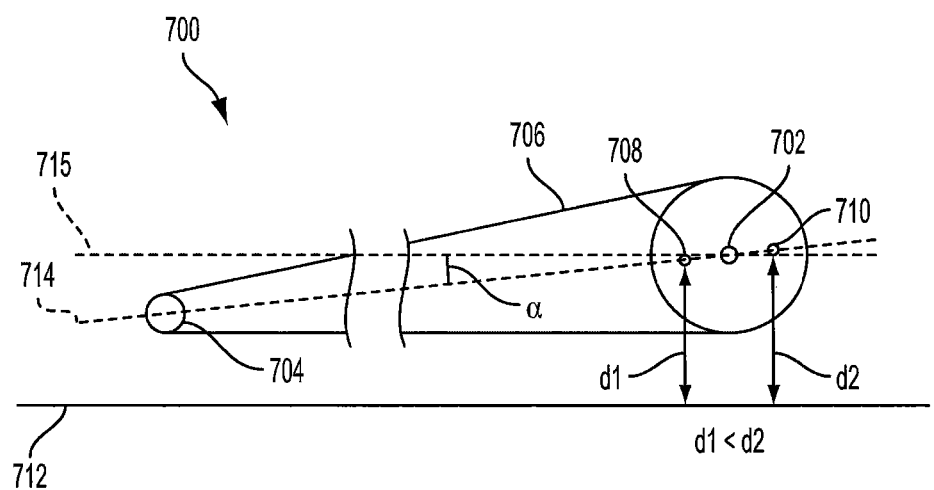
FIG. 7 illustrates the axis of motor mounts of an upright vacuum cleaner according to one embodiment.

Improvements can be implemented with different motor mount implementations. For example, FIG. 7 illustrates the motor mounts of a vacuum cleaner, such as the instant vacuum cleaner. Motor 701 and motor shaft 702 drive belt 706 to rotate a beater bar 704. In the instant vacuum cleaner, motor mounts 708 and 710 are different distances from cleaning surface 712. In one example, the distance (d1) between motor mount 708 and cleaning surface, is shorter than the distance (d2) between motor mount 710 and cleaning surface 712 (d1<d2). Axis 715 represents prior art axis line 614 of prior art vacuums as illustrated in FIG. 6. In one example, distance (d1) between motor mount 708 and cleaning surface 712 is shorter than the distance (d2) between motor mount 710 and cleaning surface 712. As such imaginary axis 714 can traverse a center of beater bar 704, motor mount 708, motor shaft 702 and motor 710 is a generally co-linear fashion. Thus, imaginary axis 714 is not parallel to cleaning surface, unlike the prior art imaginary axis 715 which while generally parallel to cleaning surface 712 did not traverse a center of a beater bar (see FIG. 6). The generally co-linear alignment along axis 714 reduces a load on motor 701, motor shaft 712 and belt 706. This can significantly reduce the wear and tear on motor 701, drive belt 702 and beater bar 714.

FIG. 8 shows a perspective view of filter bag 140 positioned to engage bag docking assembly 154. The filter bag 140 has a bag inlet 144 through which dirty air enters the filter bag 140 for collection of entrained dirt. Filter bag 140 can have a dirt carrying capacity of about 1-10 quarts. In some embodiments, the dirt carrying capacity is between about 4-8 quarts, or more preferably 6-8 quarts dirt carrying capacity. In a most preferred embodiment, the dirt carrying capacity of filter bag 140 is about 8 quarts.

The bag inlet 144 is surrounded by a reinforced collar 146. The bag inlet 144 can also be surrounded by an elastic collar seal 812 to create a substantially air-tight seal when the filter bag 140 is engaged with bag mount dirty air intake 506. Filter bag 140 may include a sliding member 816 that slides between an opened position and a closed position over the bag inlet 144. When sliding member 816 is in the closed position, it prevents spillage of the captured dirt when the filter bag 140 is disengaged from the vacuum cleaner 100 (FIG. 1). Collar securing apertures 814 may be located on sliding member 816 to provide a grip for retaining collar 146 and for moving sliding member 816. Collar 146 may also include voids 818 and 820 to aid in securing and orienting collar 146 in support body 156.

The bag mount assembly 154 may include support body 156. Support body 156 is pivotally attached to the bag mount assembly 154 at support body pivot member 804. Support body 156 pivots between a loading position, in which the collar 146 of filter bag 140 may be engaged or disengaged with the support body 156, and a working position, in which the bag inlet 144 engages the bag mount dirty air intake. Support body 156 may also include collar securing tabs 808 which define a channel 802. Channel 802 can receive an edge of bag collar 146 and aids in holding collar 146 to support body 156. Channel 802 slidably receive the edges of collar 146 on filter bag 140. Channel 802 allows a user to easily slide collar 146 on and off of support body 156. Channel 802 may also have press features (not shown) formed into them to ensure that bag collar 146 is held tightly in support body 156. Preferably, bag mount 154 can use less material for receiving filter bag collar 146 compared to prior art bag mounts. Use of less material, with fewer parts can reduce production costs, and less parts can result in fewer parts that may potentially break or wear out over time—thereby potentially increasing the longevity of the vacuum cleaner.

Support body 156 may also include one or more collar securing fasteners 810 to secure collar 146 to support body 156. The collar securing fasteners 810 are positioned to engage the collar securing apertures 814 disposed in sliding member 816 of filter bag 140. Advantageously, collar securing fasteners 810 secure the edge of bag collar 146 directly, versus prior art fasteners which fasten bag mount portions to other bag mount areas. By directly fastening the collar to bag mount 154, proper bag collar 146 placement is more easily identifiable by the user. Also, because collar securing fasteners 810 may be made of a different material or color than bag collar 146, a user can easily identify proper bag collar 146 placement and/or removal. Additionally, multiple collar securing fasteners 810 provide a stronger attachment of bag collar 146 to bag mount 154, reducing the likelihood that the collar may become detached.

The bag mount assembly 154 may also include bag mount support columns 510 which may include bag mount collar locking clips or hook latches 522, bag mount vertical locking key 518 and bag mount horizontal locking key 520, which are used to orient and secure filter bag 140. Bag mount vertical locking key 518 and bag mount horizontal locking key 520 correspond to voids 818 and 820 in collar 146 that are mated to one other when the support body 156 is in a working position. When the bag mount vertical locking key 518, bag mount horizontal locking key 520 are fully engaged with voids 818 and 820, bag collar 146 has been properly aligned and support body 156 is able to close. In a further preferred embodiment, the locking keys are vertical and horizontal in nature to ensure that the bag collar is not inserted upside down or backwards which would result in misalignment of bag collar 146 and leakage of the dirty air stream. A latch mechanism, such as bag mount collar locking clips 522 lock a distal engagement of collar 146 when the support body 156 is in a working position to retain collar 146 and support body 156 against support columns 510, i.e., retain support body 156 in a working position.

In a preferred embodiment, the support body 156 is formed of a plastic that has been injection molded into a substantially planar body. The support body 156 is formed with an opening 822 that is positioned to correspond with bag inlet 144 when collar 146 of filter bag 140 is retained within the support body 156 in the proper position for engagement with the bag mount dirty air intake.

Filter bag 140 can be engaged with the bag mount assembly 154 by inserting collar 146 within collar receiving gaps 802 on support body 156. When the filter bag 140 is fully engaged with support body 156, the bag inlet 144 aligns with the support body opening 822 in the support body 156 and collar securing apertures align with collar securing fasteners 810. When the support body 156 is rotated into the working position, the bag inlet 144 aligns with and engages the bag mount dirty air intake 506, and voids 818 and 820 of collar 146, aligns with bag mount vertical locking key 518 and bag mount horizontal locking key 520 on support columns 510.

Collar 146 may include sliding member 816 which slides between an opened position and a closed position. A user may grasp pull tab 152 to pull bag collar 146 out of support body 156. Collar securing fasteners 810 have a hooked portion 824 at its distal end that engages the collar securing apertures 814 when collar 146 is fully engaged with support body 156. The engagement of collar securing fasteners 810 with collar securing apertures 814 operates to close sliding member 816 over the bag inlet 144 upon removal of the filter bag 140 from support body 156. When the user removes filter bag 140 from support body 156 via the pull tab 152, the hooked portion 824 of collar securing fasteners 824 resists the force exerted by the user. The force necessary to move sliding member 816 is less than the force necessary to disengage collar securing fasteners 810 from the collar securing apertures 814. As a result, sliding member 816 remains stationary as bag collar 146 is removed from support body 156. Collar slides 150 are secured to a distal end of sliding member 186, and are within collar slots 148. Collar slots 148 may provide a positive stop in collar 146 to prevent sliding member 816 from being pulled out of collar 146 entirely.

Once sliding member 816 is fully closed over bag inlet 144, all of the force exerted by the user is transferred to collar securing fasteners 810. This additional force frees collar securing apertures 814 from the collar securing fasteners, and in turn disengages the collar 146 and filter bag 140 from support body 156.

Advantageously, bag collar 146 is smaller than prior art bag collars with sliding members. Reduction in size reduces production costs, ultimately resulting in lower costs for the consumer. A top edge of the collar can extend beyond the top edge of the bag.

FIG. 9 illustrates an exploded view of vacuum cleaner base plate 103, vacuum cleaner base cover 124 and a vacuum cleaner air path cover. Vacuum cleaner base plate 103 can include wheel mount portion 901, which includes one or more wheel mounts 107. Vacuum cleaner base plate 103 can include beater bar portion 903 which can include beater bar housing 116. Base plate 103 may include passage portion 902 which can connect motor mounts 107 to beater bar portion 903. Vacuum cleaner base plate 103 including wheel mount portion 901, beater bar portion 903, and passage portion 902 can be a single piece construction. Passage portion 902 can connect motor mount portion 901 to beater bar portion 903. Passage portion 902 can include walls 940 and floor 942. Passage portion 902 also serves to enclose and support other internal features of vacuum cleaner 100, such as circuit board 190 and dirty air intake duct 175 (See FIG. 3). Internal components may be received in slots or receptacles within passage portion 902. For example, circuit board 190 may be secured within circuit board receiving slot 926.

In some embodiments, passage portion 902 has parallel side portions. In some embodiments, passage portion 902 has a rear portion closest to wheel mount portion 901 that is wider than a forward portion that is closest to beater bar portion 903, e.g., passage portion 902 may taper in width from the rear of vacuum cleaner base 102 to the front of vacuum cleaner base 102. In some embodiments, passage portion 902 is narrower in width than the wheel mount portion 901 of base plate 103. In some embodiments, passage portion 902 is narrower in width than beater bar portion 903. In some embodiments, passage portion 902 is narrower than both wheel mount portion 901 and beater bar portion 903. In some embodiments, beater bar portion 903 comprises receptacles (not shown) to secure beater bar 192 (FIG. 3). In some embodiments, portions of passage portion may be about 1.25 mm in thickness. However, it should be understood that the thickness of passage portion 902 may vary from about 1.0 mm to about 2.5 mm. In some embodiments, base plate 103 has a uniform thickness. In some embodiments, base plate 103 has different thicknesses in different regions or areas of the base plate 103. For example, the motor mount portion 901 may be thicker than passage portion 902, which is thicker than beater bar portion 903. Motor mount portion 901 may be thicker than passage portion 902 or beater bar portion 903. Passage portion 902 may be thicker than motor mount portion 901 or beater bar portion 903. Beater bar portion may be thicker than passage portion 902 or motor mount portion 901. It should be understood that even sub-regions within motor mount portion 901, passage portion 902 or beater bar portion 903 can have different thicknesses or similar thicknesses. Wall thickness may vary with shape because curves and embosses are stronger for same wall thickness than is a flat section. A skilled artisan would know how the thickness of various portions and areas of base plate 103 relates to structural and functional requirements of base plate 103, and any structural or functional components housed in or near the different areas, in order to produce a sufficient and functional base plate 103.

In some embodiments, base plate 103 may have walls 940 of unitary thickness. In some embodiments base plate 103 may have walls 940 that have different thicknesses. For example, base plate 103 may have walls 940 that taper (e.g. walls 940 may progressively get thinner or thicker). This is called "draft angle" and is primarily used to allow the die cast part to more readily be removed from the mating die cast mold, otherwise suction and friction prevent removal after casting. In some embodiments, walls 940 may range in thickness from about 1.5 mm to about 2.5 mm. A skilled artisan would know how the thickness of various walls 940 of base plate 103 relate to structural and functional requirements of base plate 103, and any structural or functional components housed in or near the walls, in order to produce a sufficient and functional base plate 103. In some embodiments, floor 942 may have a uniform thickness or may have areas of different thicknesses. In some embodiments, floor 942 may range in thickness from about 1.0 mm to about 2.0 mm. In general, base plate 103 can include structural support elements such as trunnions, ribs, side walls and motor mounts. Generally, base plate 103 can have trunnion ribs, screw bosses and trunnions as having a thickness from 0.5 mm to 5 mm, preferably 0.75 mm to 2.5 mm. If desired, some sections such as support members, ribs or other structural elements can be formed from magnesium, and other sections can be formed from other materials. In some embodiments, wheel mount 107 may have a uniform thickness or may have areas of different thicknesses. In some embodiments, wheel mount 107 may range in thickness from about 0.75 mm to about 1.75 mm.

As shown in FIG. 9, base plate 103 may include one or more wheel mounts 107. In a preferred embodiment, base plate 103 includes at least two wheel mounts 107. Wheel mounts 107 may include both flat and curved planar portions. For example, in a preferred embodiment, wheel mount 107 may include flat planar portions 912 and curved planar portions 914 which aid in orienting and securing motor assembly 187 received therein (FIG. 3). When motor assembly 187 is properly inserted into wheel mount 107, planar portions prevent the motor assembly from rotating within wheel mount 107. Wheel mounts 107 may also include locking slots 916 which receive track hubs locking tabs 113 in order to secure wheel assemblies 109 and tracks 110 to vacuum cleaner base 102 (FIG. 4). Each wheel mount 107 may include one, two or more locking slots 916. Additionally, wheel mount ribs 938 may serve to prevent wheel assembly 109 from lateral movement when assembled on wheel mount 107.

Wheel mounts 107 may include one, two or more areas which allow a motor assembly 187 to be fastened within wheel mount 107. For example, wheel mount 107 may include motor locking tabs 928 which correspond to and friction fit with motor end plate notch 197 on motor end plate 188, when motor end plate 188 is properly inserted into wheel mount 107 (See, FIG. 3). Planar portions 912 of wheel mount 107 correspond to and friction fit with motor end plate flat edge 188 when motor end plate 188 is properly inserted into wheel mount 107 (See, FIG. 3). The combination of motor locking tabs 928 and planar portions 912 of wheel mount 107 allow friction fit to secure motor end plate 188. Vacuum cleaner base cover 124 can secure the top of motor assembly 187. As such motor assembly 187 is secured within wheel assembly 107 without any additional fasteners.

Base plate 103 may include a cradle section 904 (e.g. trunnion) within wheel mount portion 901. Cradle section 904 may include one or more motor support platforms 930 (e.g. trunnion ribs) created by one or more cradle walls 918 which define the distal portions of cradle section 904. Cradle walls 918 prevent a motor from lying directly against an exterior portion of base plate 103, thereby creating an internal chamber between motor assembly 197 and base plate 103.

Multiple vents 906 allow air into and out of base plate 103, allowing heat and any entrapped particles within base plate 103 to conveniently exit vacuum cleaner base 102 when assembled. Although not shown, additional vents can be included on distal portions of cradle section 904.

Wheel mount portion 901 may also include power cord apertures 908 and 910 which allow entry to power cord 182 and 186 to supply A/C power to motor assembly 187 or to provide signaling power to internal components of the vacuum (See FIG. 2).

As discussed above, a wheel mount 107 is capable of housing a motor assembly to drive a beater bar. A single piece construction for base plate 103 can advantageously reduce the "foot print" of the vacuum cleaner base and reduce the amount of materials and time required to produce the vacuum. However, by housing a motor within wheel mount 107, and is securing it within the vacuum housing through friction fit can produce a lot of stress upon base plate 103 and wheel mount 107, in particular.

Base plate 103 can comprise any material with a suitable strength-to-weight ratio. In one embodiment, magnesium is a suitable material for base plate 103. In one embodiment, materials such as carbon fibers (e.g. graphite) or titanium or other alloys may provide suitable strength, be light-weight, and have low production costs. In some embodiments, the material can provide increased damping capacity, and can thereby reduce the noise generated by any moving parts or motors within the vacuum. A skilled artisan would know what structural/functional properties are desired in a material, and would be able to choose a material formulation that best meets as many of those properties as possible. In one embodiment, base plate 103 can be manufactured by die casting the suitable material. However, it should be understood that any suitable manufacturing process may be used to produce base plate 103. In a preferred embodiment, base plate 103 comprises Magnesium Die Cast Metal. For example, AZ91D is a specific ASM material formulation of magnesium that provides the desired strength-to-thickness. AZ91D comprises: 8.3-9.7% Al; 0.15% Mn min.; 0.35-1.0% Zn; 0.10% Si max.; 0.005% Fe max.; 0.030% Cu max.; 0.002% Ni max.; 0.02% max. other (each); and balance Mg. Materials having similar or greater strength-to-thickness are included in the present teachings. Additional information regarding Magnesium Die Case Metal AZ91D can be found at, for example, the URL mg.tripod.com/asm_prop.htm.

Depending on their implementation and design arrangement, items such as aluminum, steel and iron may not have both suitable strength and light weight requirements. Additionally, aluminum, steel and iron may possibly have increased production costs, when factoring in costs for raw materials and shipping are included. Use of steel in a base plate with suitable strength can potentially result in a base plate with 4 times the weight of a magnesium base plate. Further, injection molded plastics depending on implementation and design arrangements may not be suitable for base plate 103 to be formed thereof. Use of injection molded plastics can potentially result in a base plate with 2 times the weight of a magnesium base plate. Use of injection molded plastics may also result in a much thicker base plate, thus requiring more product and increasing production costs.

In some embodiments, additional portions of the vacuum cleaner may comprise magnesium. For example, while handle 106 and vacuum base 102 are illustrated as comprising magnesium, other parts, such as air conduits, wheels, cord hooks, etc may also include magnesium. In some embodiments, all of, or substantially all of, vacuum cleaner 100 can comprise magnesium. A skilled artisan would know how to determine the proper structural, strength, and weight characteristics of various parts and portions of a vacuum cleaner using magnesium. In some embodiments, the portions of the vacuum cleaner that comprise magnesium may be substantially free of other materials. In some embodiments, the portions of the vacuum cleaner that comprise magnesium may include about 0.1% to about 100% magnesium. Without limitation, the portions may include about 0.1, 0.5, 1.0, 10, 15, 20, 25, 30, 35, 40, 45, 50, 55, 60, 65, 70, 75, 80, 85, 90, 95, 96, 97, 98, 99, 99.9, to about 99.99% magnesium. In some embodiments, the additional portions of the vacuum cleaner may include materials with characteristics similar to magnesium. In these embodiments, the portions of the of the vacuum cleaner that comprise materials with characteristics similar to magnesium may be substantially free of other materials. In some embodiments, the portions of the vacuum cleaner that comprise materials with characteristics similar to magnesium may include about 0.1% to about 100% magnesium. Without limitation the portions may include about 0.1, 0.5, 1.0, 10, 15, 20, 25, 30, 35, 40, 45, 50, 55, 60, 65, 70, 75, 80, 85, 90, 95, 96, 97, 98, 99, 99.9, to about 99.99% materials with characteristics similar to magnesium.

Vacuum cleaner base cover 124 may be secured to base plate 103 via fasteners. Fastener receivers 920 (e.g. bosses) in base plate 103 may correspond to fastener receivers 932 in base cover 124. A fastener (not shown) such as a screw or rivet, may be used to secure a base plate to base cover 124. Additionally, air path cover 125 may be secured to base plate 103 via fasteners. Fastener receivers (not shown) in base plate 103 may correspond to fastener receivers 934 in air path cover 125. A fastener (not shown) such as a screw or rivet, may be used to secure base plate 103 to air path cover 124.

In some embodiments, vacuum cleaner 100 weighs between about 5 to about 10 pounds. In some embodiments, vacuum cleaner 100 weighs between about 6 to about 8 pounds. In a preferred embodiment, vacuum cleaner weighs about 7 pounds.

In some embodiments, vacuum cleaner 100 can further comprise an attachment hose and hand held attachments. For example, one embodiment of a hand held attachment may include a flexible hose or a rigid hose. Vacuum cleaner 100 may include an extendible crevice tool that is partially or wholly integrated into a flexible or rigid hose. In some embodiments, hand held attachments can include, but are not limited to brushes, squeegees, beater bars, extension hoses, nozzles, etc. In some embodiments, the upright vacuum cleaner may comprise a tool caddy for easy and convenient storage of a hand held attachment, for example, an extendible crevice tool. A tool caddy can be disposed on dust collection assembly 104 or vacuum cleaner base 102. A tool caddy can friction fit around an extendible crevice tool for easy storage and management of flexible or rigid hoses, extendable crevice tools or other hand held attachments.

Combinations of different features illustratively described in connection with the embodiments are also contemplated. Although the embodiments illustrated herein relate to upright vacuum cleaners, alternative vacuum cleaner configurations (e.g. hand held, canister, etc.) are also contemplated.

The various embodiments described above are provided by way of illustration only and should not be constructed to limit the invention. Those skilled in the art will readily recognize the various modifications and changes which may be made to the present invention without strictly following the exemplary embodiments illustrated and described herein, and without departing from the true spirit and scope of the present invention, which is set forth in the following claims.

What is claimed is:

1. A vacuum bag comprising:
a semi-permeable dirt bag having a top edge, a bottom edge opposite the top edge, a first side surface that extends from the top edge to the bottom edge, and a second side surface directly opposed to the first side surface, the second side surface extends from the top edge to the bottom edge;
a generally flat collar having a top edge and a bottom edge, the collar located on the first side surface of the semi-permeable dirt bag, the semi-permeable dirt bag extends beyond the bottom edge of the collar; and
a first opening in the collar configured to accept a dirty air nozzle,
where the top edge of the semi-permeable dirt bag is coextensive with or does not extend beyond the top edge of the collar.

2. The vacuum bag of claim 1, further comprising:
a second opening in the collar elongated in a first direction;
a third opening in the collar elongated in a second direction where the second and third openings are configured to allow the vacuum bag to be moved into a fully installed position onto the dirty air nozzle when the collar is in a correct orientation.

3. The vacuum bag of claim 1, further comprising an air impermeable membrane disposed opposite the first opening within the semi-permeable bag.

4. The vacuum bag of claim 1, wherein the top edge of the collar comprises a chamfered corner of the collar.

5. The vacuum bag of claim 1, wherein the collar further includes an elastic seal surrounding the first opening.

6. The vacuum bag of claim 1, wherein the collar further includes a sliding panel that slides between an open position and a closed position over the first opening.

7. The vacuum bag of claim 6, wherein the collar further includes a positive stop limiting the movement of the sliding panel.

8. The vacuum bag of claim 6, wherein the collar further includes a retainer opening that accepts a retainer member on a bag mount.

9. The vacuum bag of claim 1, wherein the collar comprises a flat stock of generally stiff material.

* * * * *